H. G. GINACA.
PINEAPPLE CENTERING ATTACHMENT.
APPLICATION FILED NOV. 14, 1912.

1,075,031.

Patented Oct. 7, 1913.

Witnesses

Inventor
Henry G. Ginaca
By Ennui, Goldsborough, O'Neill
Attorneys

UNITED STATES PATENT OFFICE.

HENRY GABRIEL GINACA, OF HONOLULU, TERRITORY OF HAWAII, ASSIGNOR TO HAWAIIAN PINEAPPLE COMPANY, LTD., OF HONOLULU, TERRITORY OF HAWAII.

PINEAPPLE-CENTERING ATTACHMENT.

1,075,031.

Specification of Letters Patent.

Patented Oct. 7, 1913.

Application filed November 14, 1912. Serial No. 731,378.

*To all whom it may concern:*

Be it known that I, HENRY GABRIEL GINACA, a citizen of the United States, residing at Honolulu, county of Honolulu, Territory of Hawaii, have invented certain new and useful Improvements in Pineapple-Centering Attachments; and I do hereby declare the following to be a full, clear, and exact description of the invention, such as will enable others skilled in the art to which it appertains to make and use the same.

This invention relates to attachments for pineapple machines for centering the fruit, and particularly to improvements in attachments of this character of the type shown in the application for patent, Serial No. 694,082, filed by me Apr. 30, 1912.

The object of the invention is to provide means to incise or slit the rind or outer portion of the fruit while the fruit is within and is moved through the centering attachment, the bottom of the incision being longitudinal and parallel to the axis of the centered fruit. The incision or slitting of the fruit takes place in one or several places in its circumference. When thus slit or incised the rind or outer portion of the fruit may thereafter be easily removed in any suitable manner.

The invention contemplates a centering attachment of the kind above mentioned, means for supporting one or more knives within the frame of the attachment, and means for adjusting the position of said knife or knives with respect to the axis of the attachment, as will hereinafter more fully appear.

Figure 1:
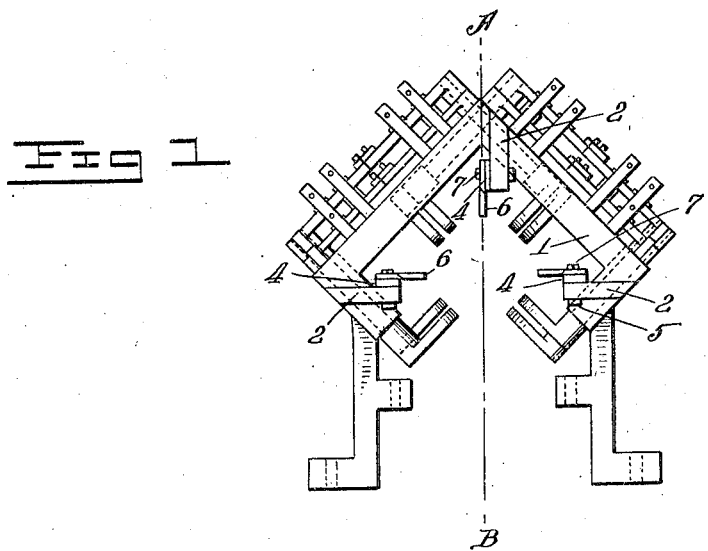
Figure 2:
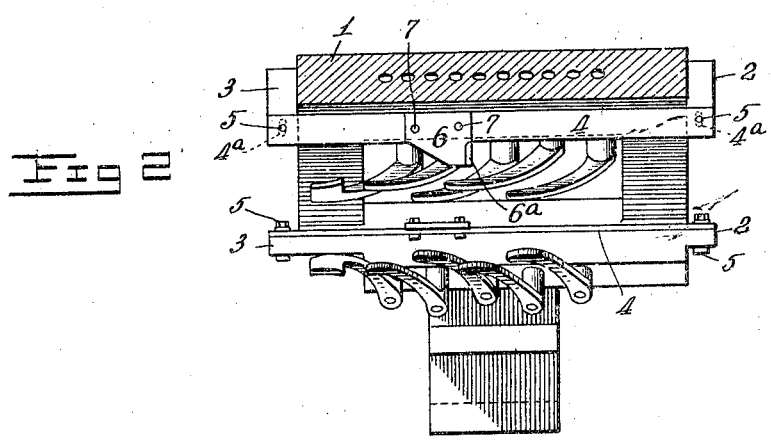

In the accompanying drawings, forming a part of this specification, Figure 1 represents in front elevation a centering attachment for pineapple machines embodying a preferred form of my improvements. Fig. 2 is a sectional view on the line A—B of Fig. 1.

Referring to the drawings, as the device for centering the fruit is the same as that described in my application above referred to, a description of the same is herein omitted. The frame 1 of the attachment is preferably provided at its front and rear ends with the lugs 2 and 3 respectively, as shown. Flat bars 4 are bolted to the lugs 2 and 3 respectively by the bolts 5, such that these bars are within the frame 1 and are parallel to the axis of the attachment. Slotted holes 4ª are provided transversely in the ends of each of the bars 4, through which the bolts 5 pass, and thus permit of the adjustment of each bar 4 with respect to the axis of the attachment, that is to say, each bar 4 may be moved toward or away from said axis and when in the desired position may then be firmly clamped by the bolts 5 to the lugs 2 and 3. A knife 6 is removably attached by the bolts 7 to each bar 4, with its cutting edge 6ª turned forward and inward between the bar 4 and the axis of the attachment.

It will now be noted, that when a fruit is pushed through the centering attachment and thereby centered therein, that its outer portion will encounter the stationary knife or knives 6 and be longitudinally incised thereby at the same time that said fruit is moved through the attachment, and that the bottom of each incision will therefore be parallel to the axis of the centered fruit, and that means are provided for adjusting each knife 6 by moving as described the bar 4 to which it is attached so that these incisions may be made any amount desired.

I am aware that knives have been used to incise the fruit in coring and sizing machines, but

What I claim is:

1. In a pineapple centering attachment, means to automatically center the fruit, and means carried by said attachment but independent of the centering means to incise the outer portion of the fruit simultaneously with the movement of the fruit through the said attachment, the bottom of each incision being parallel with the axis of the fruit.

2. In a pineapple centering device of the kind described, means to center the fruit and means independent of said first-named means for incising the outer portion only of the fruit while the fruit is moved through said centering device, the bottom of the incision being parallel with the axis of the fruit.

3. In a pineapple centering attachment, the combination of means to center the fruit, and means independent of said first-named means to incise longitudinally the outer portion only of the fruit during the centering operation, the bottom of the incision being parallel with the axis of the fruit.

4. In a pineapple centering attachment, the combination of means to automatically center the fruit, means for supporting a knife within the frame of the attachment, said knife being independent of said first-named means and means for adjusting the position of said knife with respect to the axis of the attachment.

5. In a pineapple centering device, a frame, means to center the fruit, lugs carried by said frame, a bar adjustably secured to said lugs, and a knife attached to said bar and adapted to incise the outer portion of the fruit, said knife being independent of said fruit centering means.

In testimony whereof I affix my signature, in presence of two witnesses.

HENRY GABRIEL GINACA.

Witnesses:
ARTHUR F. EWART,
ROBT. J. PRATT.